(12) United States Patent
Chang et al.

(10) Patent No.: US 10,564,774 B1
(45) Date of Patent: Feb. 18, 2020

(54) CORRECTION SCHEMES FOR DISPLAY PANEL SENSING

(71) Applicant: Apple Inc., Cupertino, CA (US)

(72) Inventors: Sun-Il Chang, San Jose, CA (US);
Myung-Je Cho, San Jose, CA (US);
Kingsuk Brahma, Mountain View, CA (US); Jesse A. Richmond, San Francisco, CA (US); Hyunsoo Kim, Stanford, CA (US); Shiping Shen, Cupertino, CA (US); Injae Hwang, Minato-ku (JP); Rui Zhang, Sunnyvale, CA (US); Shengkui Gao, San Jose, CA (US); Hung Sheng Lin, San Jose, CA (US); Jie Won Ryu, Campbell, CA (US); Junhua Tan, Santa Clara, CA (US); Hyunwoo Nho, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/008,997

(22) Filed: Jun. 14, 2018

Related U.S. Application Data

(63) Continuation of application No. 15/710,527, filed on Sep. 20, 2017, now abandoned.

(60) Provisional application No. 62/483,235, filed on Apr. 7, 2017.

(51) Int. Cl.
*G06F 3/041* (2006.01)
*G02F 1/1335* (2006.01)

(52) U.S. Cl.
CPC ...... *G06F 3/0418* (2013.01); *G02F 1/133509* (2013.01)

(58) Field of Classification Search
CPC .................. G06F 1/133509; G09G 3/2092
See application file for complete search history.

(56) References Cited

U.S. PATENT DOCUMENTS

| | | | |
|---|---|---|---|
| 7,773,061 B2 | 8/2010 | Cok et al. | |
| 8,791,931 B2 | 7/2014 | Takuma | |
| 8,937,632 B2 | 1/2015 | Li et al. | |
| 8,988,470 B2 | 3/2015 | Kang | |
| 9,070,316 B2 | 6/2015 | Verstraete et al. | |
| 2006/0012311 A1 | 1/2006 | Ogawa | |
| 2007/0040774 A1 | 2/2007 | Lee et al. | |
| 2008/0284720 A1* | 11/2008 | Fukutome | G02F 1/13454 345/102 |
| 2010/0060658 A1* | 3/2010 | Fujii | G02F 1/13318 345/589 |

(Continued)

FOREIGN PATENT DOCUMENTS

CA    2773669 A1    10/2013

*Primary Examiner* — Ryan A Lubit
(74) *Attorney, Agent, or Firm* — Fletcher Yoder P.C.

(57) ABSTRACT

Methods for mitigation of sensing error effects in display panels are disclosed. Display panels, such as pixel-based panels, may have circuitry to sense the luminance values, compare measurements with target luminance values, and provide corrections. Sensing errors, such as ones caused by sensor hysteresis and thermal fluctuations, may lead to overcorrections and visible artifacts. Mitigations schemes discussed herein include filtering of sensed signal with low pass filters, partial correction strategies, and feedforward sensing schemes. Circuitry that implements these schemes are also discussed.

11 Claims, 14 Drawing Sheets

(56) References Cited

U.S. PATENT DOCUMENTS

| | | | |
|---|---|---|---|
| 2010/0265228 A1* | 10/2010 | Kimura | G09G 3/3233 |
| | | | 345/207 |
| 2010/0321414 A1* | 12/2010 | Muroi | G09G 3/3413 |
| | | | 345/690 |
| 2011/0037786 A1* | 2/2011 | Hasegawa | G09G 5/10 |
| | | | 345/690 |
| 2011/0097012 A1* | 4/2011 | Tatsumi | G09G 5/10 |
| | | | 382/274 |
| 2011/0285763 A1 | 11/2011 | Bassi et al. | |
| 2013/0121419 A1 | 5/2013 | Le Dinh et al. | |
| 2013/0278578 A1* | 10/2013 | Vetsuypens | G09G 3/20 |
| | | | 345/207 |
| 2015/0294628 A1* | 10/2015 | Nakagawa | G09G 3/3607 |
| | | | 345/694 |
| 2017/0110047 A1* | 4/2017 | Yen | G09G 3/2092 |
| 2017/0116901 A1 | 4/2017 | Ogoshi | |
| 2018/0158400 A1* | 6/2018 | Matoba | G09G 3/32 |
| 2018/0190214 A1* | 7/2018 | Kim | G09G 3/20 |

\* cited by examiner

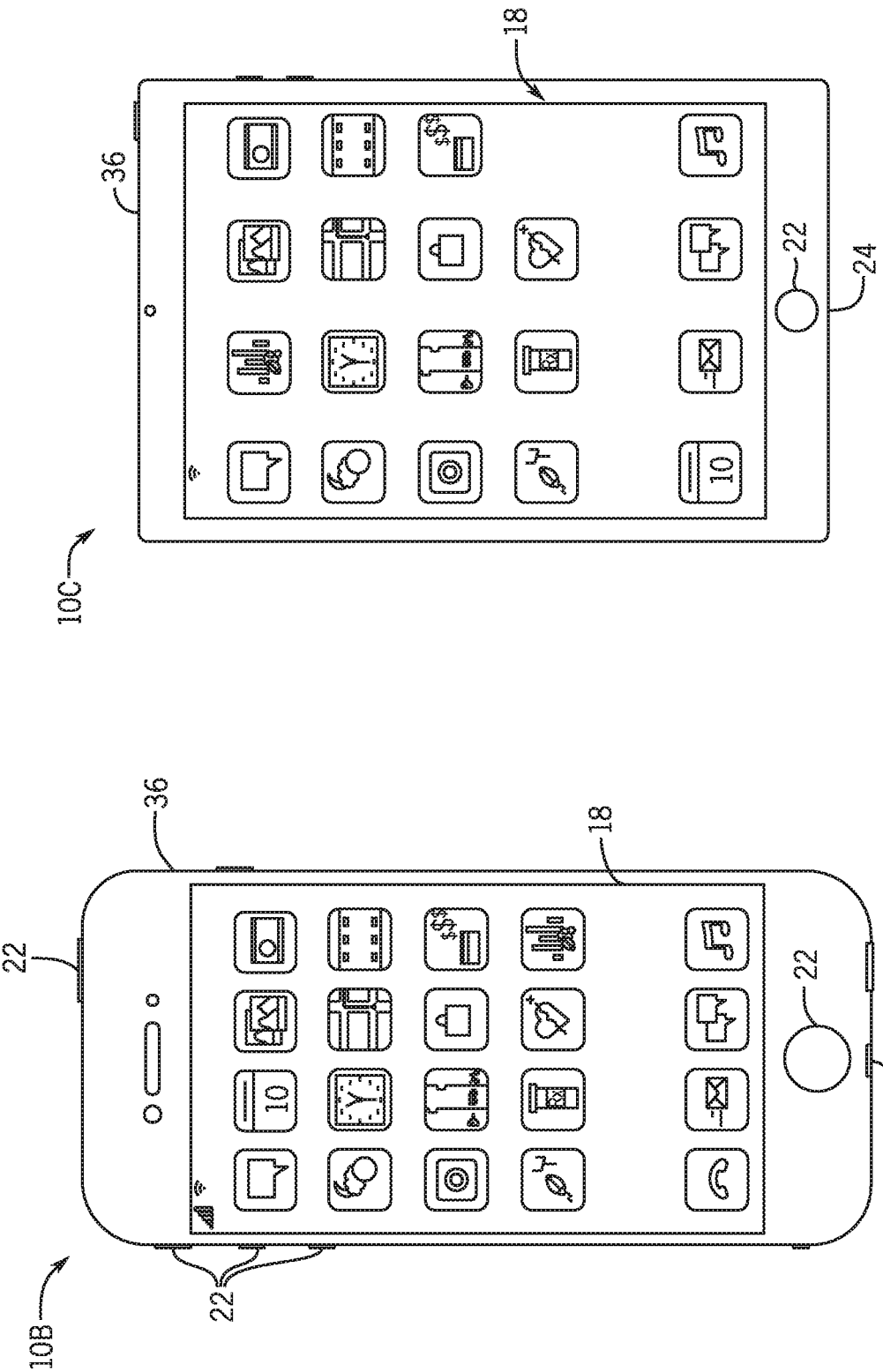

CORRECTION SCHEMES FOR DISPLAY PANEL SENSING

CROSS REFERENCE TO RELATED APPLICATIONS

This application is a continuation of U.S. patent application Ser. No. 15/710,527, filed Sep. 20, 2017, which claims the benefit of U.S. Provisional Patent Application No. 62/483,235, filed Apr. 7, 2017, which are herein incorporated by reference in its entirety and for all purposes.

BACKGROUND

The present disclosure relates generally to display panel sensing and correction, and more specifically, to methods and systems that provide uniform display on a panel with reduced visual artifacts from sensing noise and/or errors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In many devices, such as televisions, smartphones, computer panels, smartwatches, among others, pixel-based display panels are employed to provide a user interface. For example, in organic light emitting diode (OLED) panels, pixels may be driven individually, such that each pixel typically operates without regard to the operation of the surrounding or adjacent pixels. As a result of this independent operation, pixel-based displays may suffer from non-uniformity as different pixels having similar target intensity may display different intensities due to differences in the state of the respective pixels.

To obtain uniformity, the true intensity of a pixel may be identified by a sensor, and the intensity of the pixel may be adjusted based on the target intensity. This may be achieved, for example using a correction map that records pixel offsets between the true intensity and the target intensity. Presence of noise and/or errors in the sensing system may lead to a faulty corrections maps. In some situations, the faulty correction maps, or delays associated with the sensing and production of the correction maps, may lead to sudden corrections and/or over-corrections, which translate as luminance or intensity jumps and/or non-uniformities that may be visually noticeable or jarring. As a result, noise and errors in the sensing system may lead to visual artifacts perceived by the user, such as flickering.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic devices that include pixel-based displays may be susceptible to non-uniformities and other visual artifacts due to differences between target luminance outputs and real luminance outputs of the pixels of the display. Sensing data from circuitry that senses the real luminance of pixels may be used to correct errors from the non-uniformities and prevent visual artifacts. Sensing data may, in some situations, be affected by environmental factors, such as ones caused by thermal fluctuations, or prior display conditions or factors, which may manifest as sensor hysteresis. Embodiments described herein discuss methods and systems that mitigate artifacts from theses sensing data errors.

In an embodiment an electronic device having a display panel is provided. The electronic device may have sensing circuitry that measures luminance from the pixels in the display, filtering circuitry that uses a two-dimensional low pass filter to produce filtered sensing data, and data processing circuitry to produce a correction map based on the filtered sensing data. The electronic device may also have a display driver that causes the display panel to display an image based on the correction map and received image data by adjusting the luminance of the pixels of the panel.

In another embodiment, a closed-loop method for correction of display panels is discussed. The method may include steps for receiving image data, receiving sensing data from the display panel, filtering the sensing data to obtain the low-frequency content of the sensing data, converting the filtered sensing data to produce display correction data, and combining the display correction data with the image data to produce corrected image data. The corrected image data may be sent to the display.

In another embodiment, a display device is provided. The display device includes sensing circuitry configured to receive luminance measurements from the display, processing circuitry that creates a total correction map based on a comparison between the measured luminance and the target luminance, partial correction generation circuitry that is configured to create a partial correction map based on the total correction map, and feedforward circuitry that provides sensing circuitry with the total correction map and the display panel with a partial correction map.

In a further embodiment, an electronic device is provided. The electronic device may have data processing circuitry that may generate image data to be displayed to the user. The electronic device may also have a display driver that receives the image data and causes the display of images based on the image data. The electronic device may also have sensing circuitry that creates a total correction map by comparing measured luminance with target luminance and a partial correction generation circuitry that creates partial correction maps based on the total correction map and a step limit. The display driver may use the partial correction map to adjust the received image data when generating images for the display.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1, in accordance with an embodiment;

FIG. 4 is a front view of another hand-held device representing another embodiment of the electronic device of FIG. 1, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electronic devices may use display panels to provide user interfaces. Many user display panels may be pixel-based panels, such as light-emitting diode (LED) panels, organic light emitting diodes (OLED) panels and/or plasma panels. In these panels, each pixel may be driven individually by a display driver. For example, a display driver may receive an image to be displayed, determine what intensity each pixel of the display should display, and drive that pixel individually. Minor distinctions between circuitry of the pixels due to fabrication variations, aging effects and/or degradation may lead to differences between a target intensity and the actual intensity. These differences may lead to non-uniformities in the panel. To prevent or reduce the effects of such non-uniformities, displays may be provided with a sensing and processing circuitry that measures the actual intensity being provided by a pixel, compares the measured intensity to a target intensity, and provides a correction map to the display driver.

The sensing circuitry may be susceptible to errors. These errors may lead to generation of incorrect correction maps, which in its turn may lead to overcorrection in the display. The accumulated errors due to overcorrections as well as due to delays associated to this correction process may lead to visible artifacts such as luminance jumps, screen flickering, and non-uniform flickering. Embodiments described herein are related to methods and system that reduce visible artifacts and lead to a more comfortable interface for users of electronic devices. In some embodiments, sensing errors from sensor hysteresis are addressed. In some embodiments, sensing error from thermal noise are addressed. Embodiments may include spatial filters, such as 2D filters, feedforward sensing, and partial corrections to reduce the presence of visible artifacts due to sensing errors.

Figure 1:
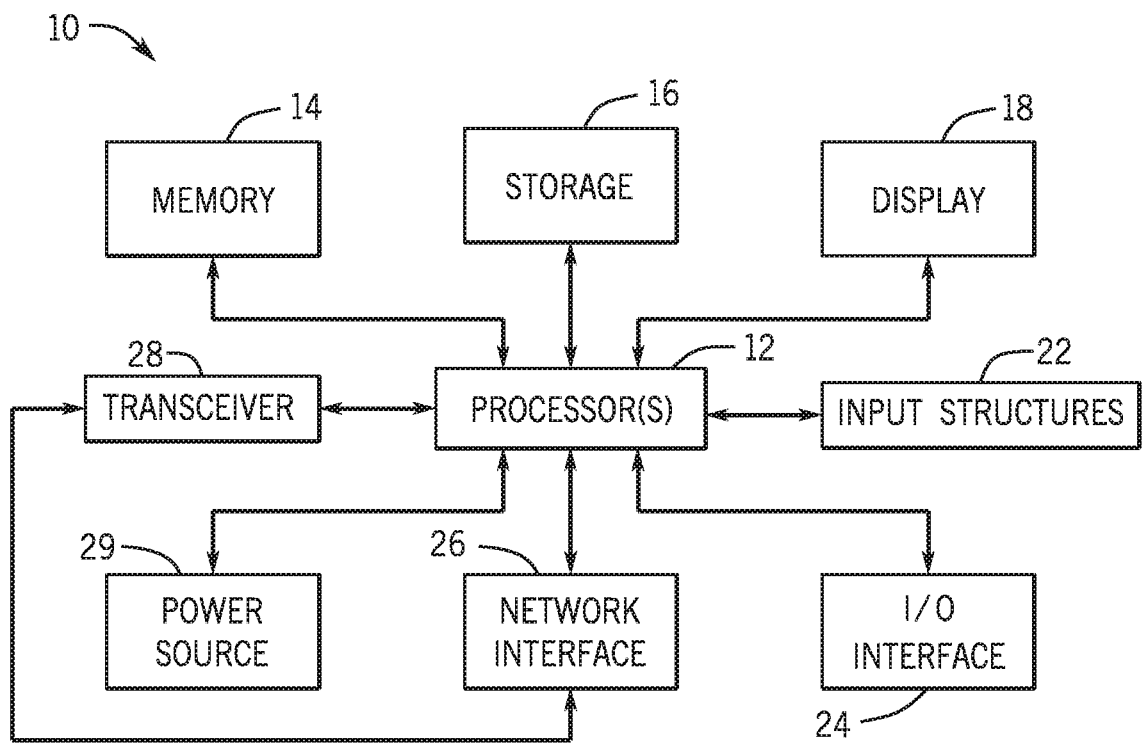
FIG. 1 is a schematic block diagram of an electronic device that may benefit from correction schemes for display pane sensing, in accordance with an embodiment.

With the foregoing in mind, a general description of suitable electronic devices that may employ displays that employ correction schemes for display panel sensing error discussed herein is provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
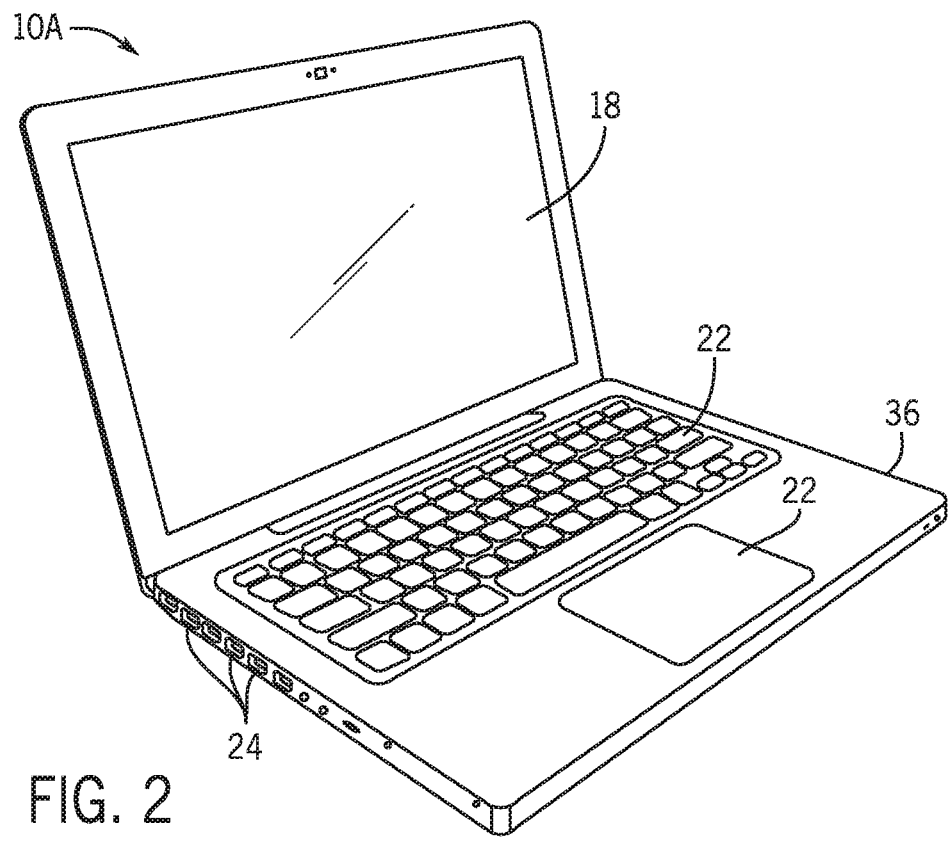
FIG. 2 is a perspective view of a notebook computer representing an embodiment of the electronic device of FIG. 1, in accordance with an embodiment.
Figure 5:
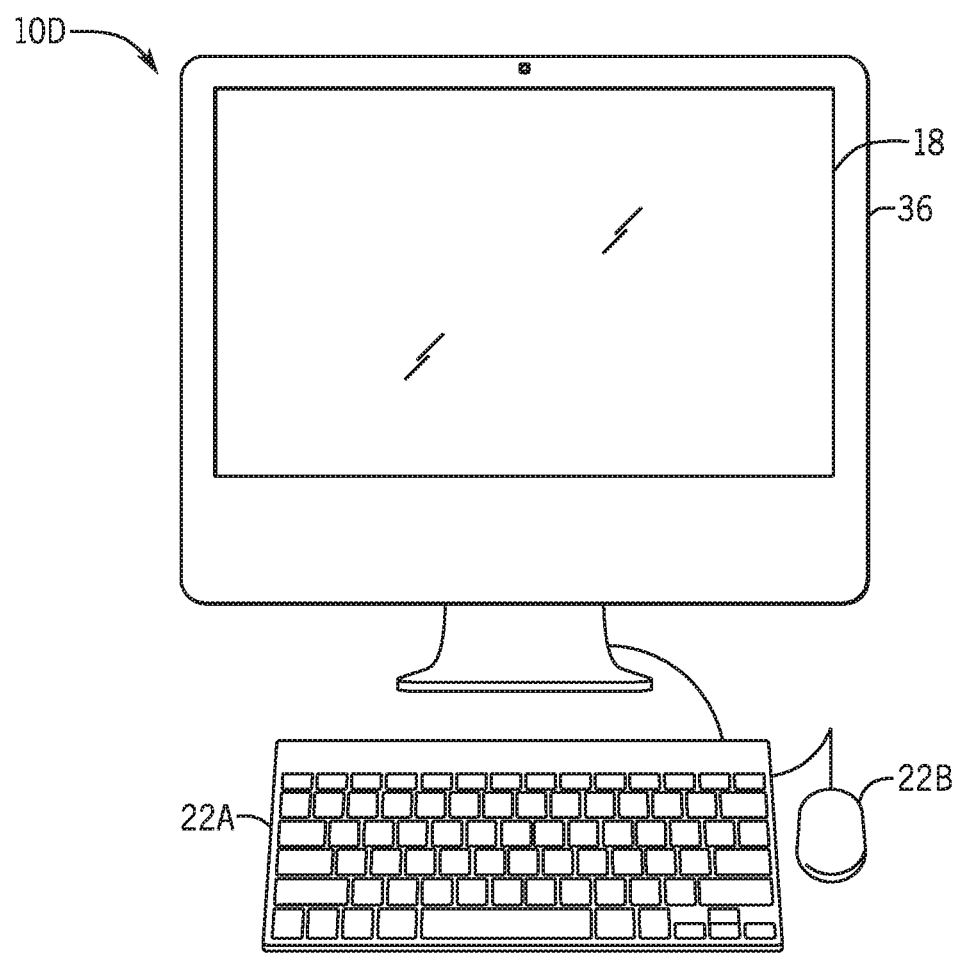
FIG. 5 is a front view of a desktop computer representing another embodiment of the electronic device of FIG. 1, in accordance with an embodiment.
Figure 6:
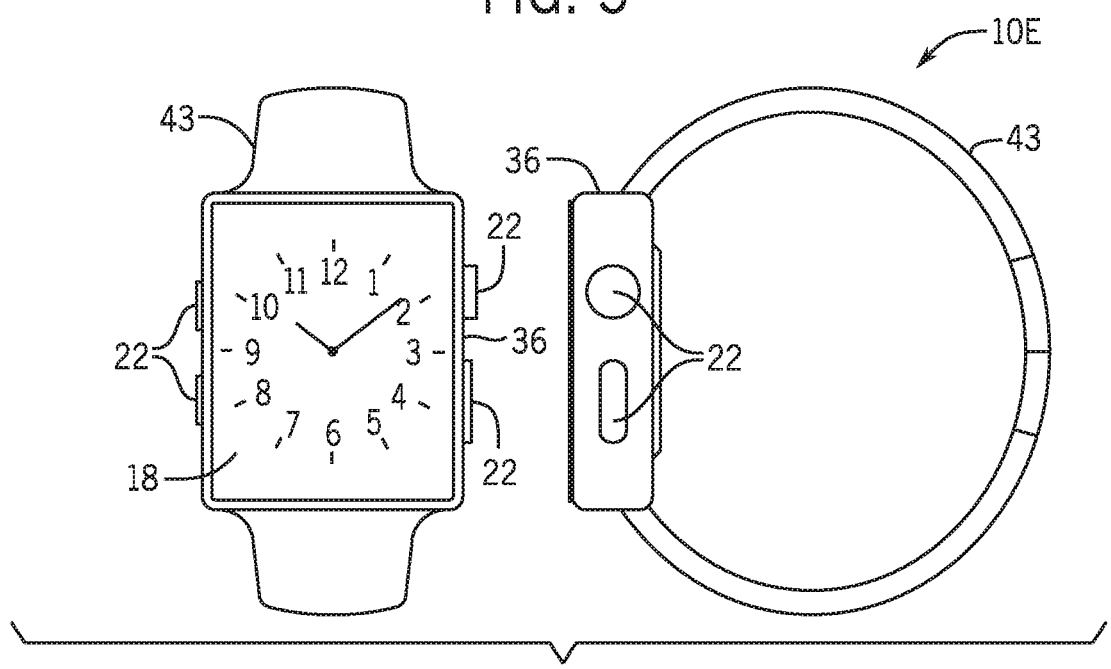
FIG. 6 is a front view and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry". Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels. Display 18 may receive images, data, or instructions from processor 12 or memory 14, and provide an image in display 18 for interaction. Display 18 may also include sensing circuitry along with correction circuitry that may be used to provide a uniform images to the user, as described herein.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. Enclosure 36 may also include sensing and processing circuitry that may be used to provide correction schemes described herein to provide smooth images in display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Diagram 100 illustrates a system that may be used to obtain uniformity across the multiple pixels of a display panel 18. A display driver 102 may receive from any other system of the electronic device data to produce an image to be displayed in display panel 18. Display panel 18 may also be coupled with sensing circuitry 106 that may measure the intensity of the pixels being displayed. Sensing circuitry 106 may operate by measuring a voltage or a current across pixel circuitry, which may be associated with the luminance level produced by the pixel. In some embodiments, sensing circuitry 106 may measure the light output of the pixel. Measurements from sensing circuitry 106 may be direct or indirect.

Sensing data may be provided to a sensor data processing circuitry 108 from the sensing circuitry 106. Sensor data processing 108 may compare the target intensities with the measured intensities to provide a correction map 110. As detailed below, in some embodiments, the sensor data processing circuitry 108 may include image filtering schemes. In some embodiments, the sensor data processing circuitry 108 may include feedforward sensing schemes that may be associated with the provision of partial correction maps 110. These schemes may substantially decrease visual artifacts generated by undesired errors introduced in the sensing circuitry 106 and provide an improved user experience.

Figure 8:
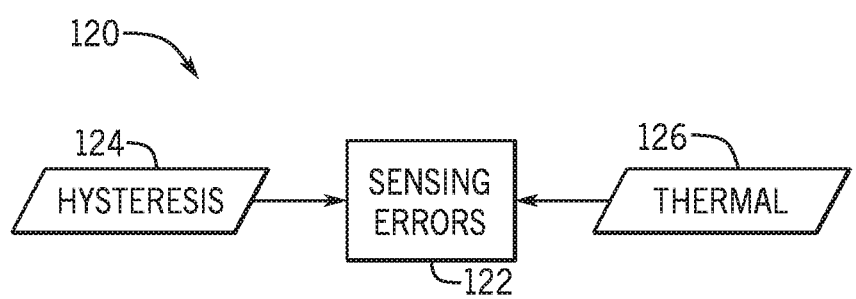
FIG. 8 is a schematic diagram of errors sources that may affect a display panel correction system such as the one of FIG. 7.
Figure 9:
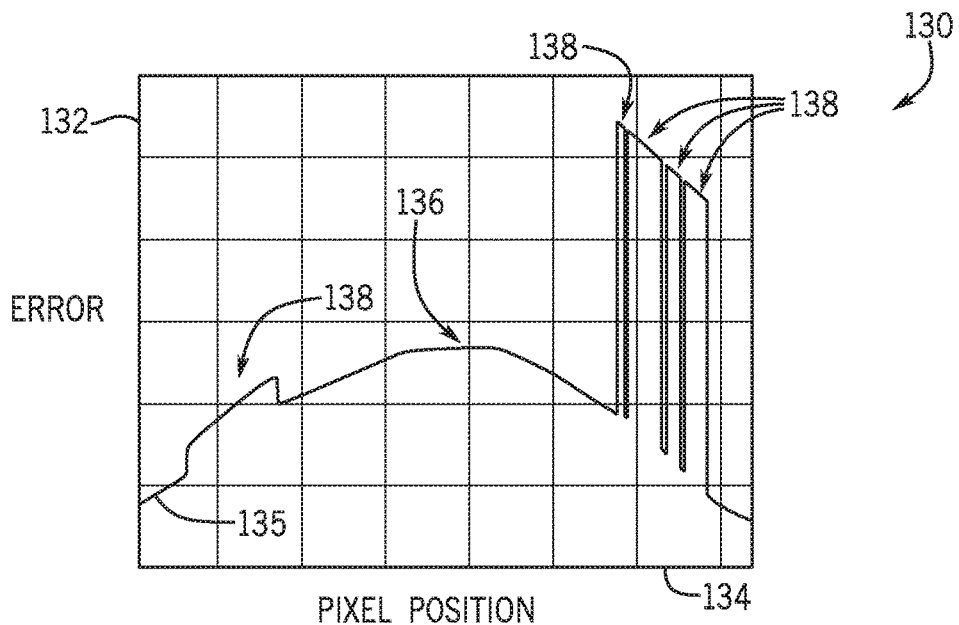
FIG. 9 is a chart illustrating sensing errors that may affect a display panel correction system such as the one of FIG. 7.

FIG. 8 provides a diagram 120 that illustrate two possible sources of sensor errors 122 that may affect sensing circuitry 106. Hysteresis errors 124 may relate to sensor errors that are caused by carryover effects from previous content, while thermal errors 126 may relate to sensor errors that are caused by temperature variations in the device. FIG. 9 provides a chart 130 that illustrates an example of errors 122 that may enter sensing circuitry 106. Chart 130 provides the error 132 as a function of pixel position 134 along a profile of a display 18. Curve 135 presents a convex shape 136 with a maximum around the center of the screen 136. This convex shape 136 may be due to thermal noise 126. Curve 135 also presents sharper artifacts 138. These sharp artifacts 138 may be caused by hysteresis errors 124. Note that thermal error 126 may be caused by variations in temperature. Since the temperature in neighboring pixels is correlated, thermal errors may have a smooth error profile. By contrast, hysteresis errors 132 may occur at the individual pixel level, and there may be very little correlation between hysteresis errors 132 in neighboring pixels. As a result, the error profile may be associated with the discontinuous sharp artifacts 138 seen in curve 135.

Figure 10A:
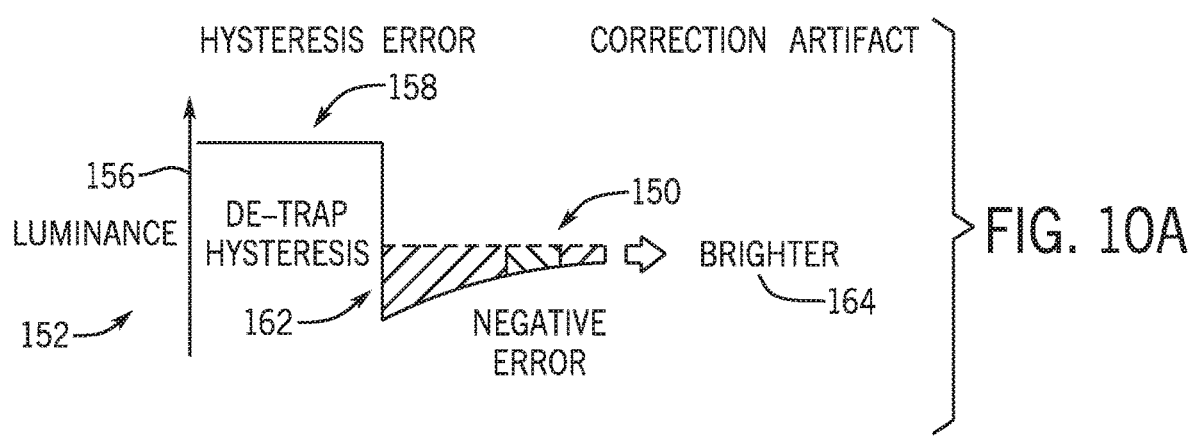
FIGS. 10A and 10B illustrate hysteresis errors that may affect a display panel correction system such as the one of FIG. 7.
Figure 10B:
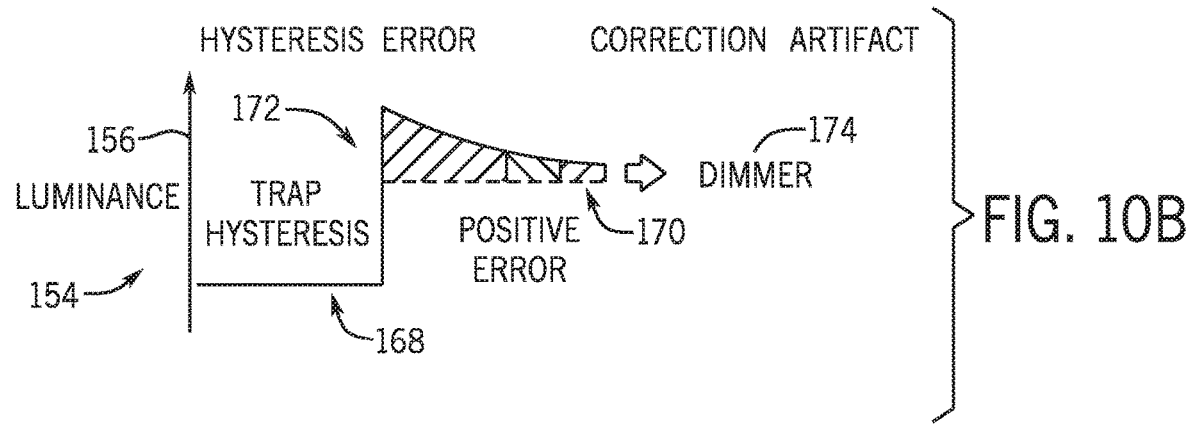

FIGS. 10A and 10B illustrate two types of hysteresis errors 132 that may occur. Diagram 152 in FIG. 10A illustrates a de-trap hysteresis, while diagram 154 in FIG. 10B illustrates a trap hysteresis. A de-trap hysteresis (diagram 152) occurs when the luminance 156 of a pixel goes from a high value 158 to a low target value 150. As a carry-over from the high value 158, the sensor may underestimate the actual luminance 156, resulting in an overcorrection that provides a negative error 162. This results in a brighter visual artifact 164. A trap hysteresis (diagram 154) may occur when the luminance 156 of a pixel goes from a low value 168 to a higher target value 170. As a carry-over from the low value 168, the sensor may overestimate the actual luminance 156, resulting in an overcorrection that provides a positive error 172. This results in a dimmer visual artifact 174. Note that neighboring pixels may suffer from different levels or types of hysteresis, and therefore sensing errors from neighboring pixels may be uncorrelated. This may lead to correction artifacts that present high spatial frequency (e.g., sharp artifacts in curve).

Figure 11:
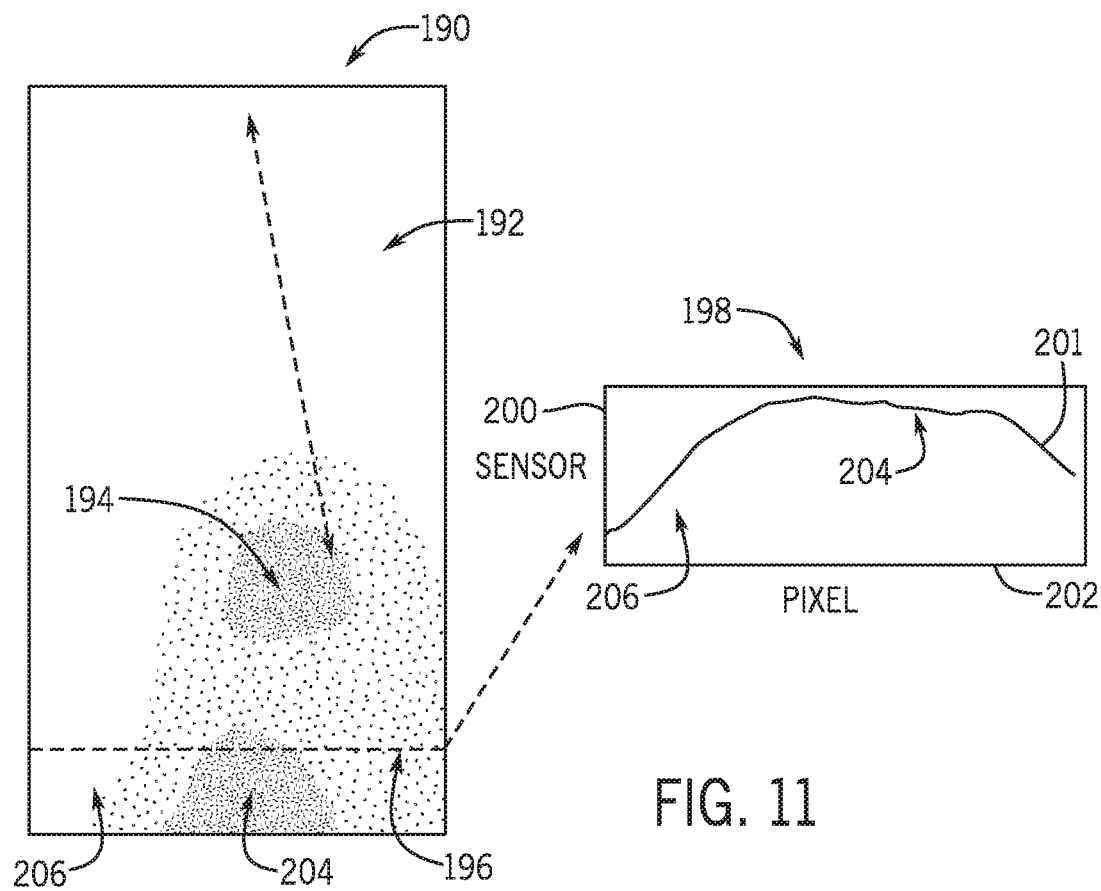
FIG. 11 is an illustration of thermal errors that may affect a display panel correction system such as the one of FIG. 7.

FIG. 11 illustrates the effect of thermal noise on the measurement from the sensor. Heat map 190 illustrates thermal characteristics of a display having colder areas 192 and warmer areas 194. Chart 198 illustrates sensor measurements of a horizontal profile 196 across the display. Sensor measurement 200 is given as a function of the pixel coordinate 202 within the profile 196, as indicated by curve 201. Note that in warmer regions of profile 196 (e.g., region 204) the corresponding sensor measurement is higher than in colder regions (e.g., region 206). Note, further, that the thermal characteristics do not vary sharply between neighboring pixels, resulting in a curve with low spatial frequency (e.g., smooth curve).

Figure 12:
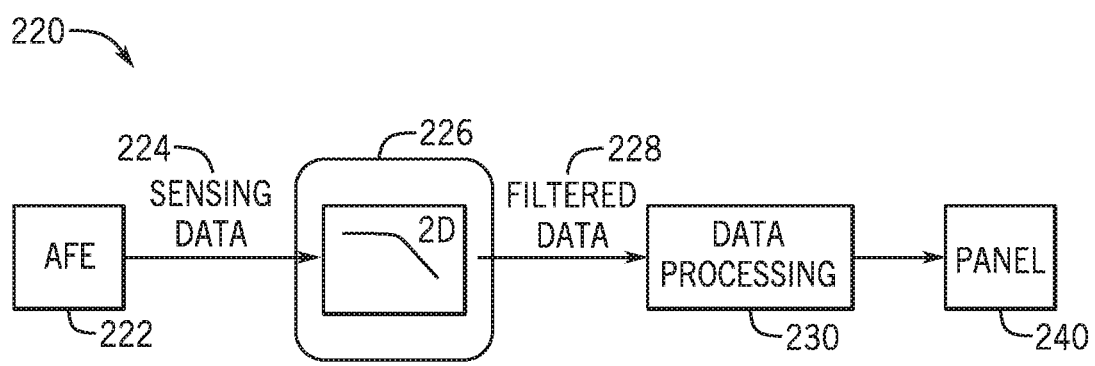
FIG. 12 is a schematic diagram of a system to increase tolerance to hysteresis-induced sensing errors, and that may be used in the display panel correction system such as the one of FIG. 7, in accordance with an embodiment.

As discusses above, sensing errors from hysteresis effects appear as high frequency artifacts while sensing errors from thermal effects appear as low frequency artifacts. Suppression of the high frequency component of the error may be obtained by having the sensing data run through a low pass filter, which may decrease the amount of visible artifacts, as discussed below. FIG. 12 illustrates a system 220 that may be used to suppress high frequency components of the error from the sensing circuitry of a display. Sensors 222 may provide sensing data 224 to a low pass filter 226. The low pass filter may be a two-dimensional spatial filter 226. In some implementations the two-dimensional spatial filter may be a Gaussian filter, a triangle filter, a box filter, or any other two-dimensional spatial filter. The filtered data 228 may then be used data processing circuitry 230 to determine correction factors or a correction map that may be forwarded to panel 240. In some implementations, data processing circuitry 230 may employ look-up tables (LUT), functions executed on-the-fly, or some other logic to determine a correction factor from the filtered data 228.

Figure 13:
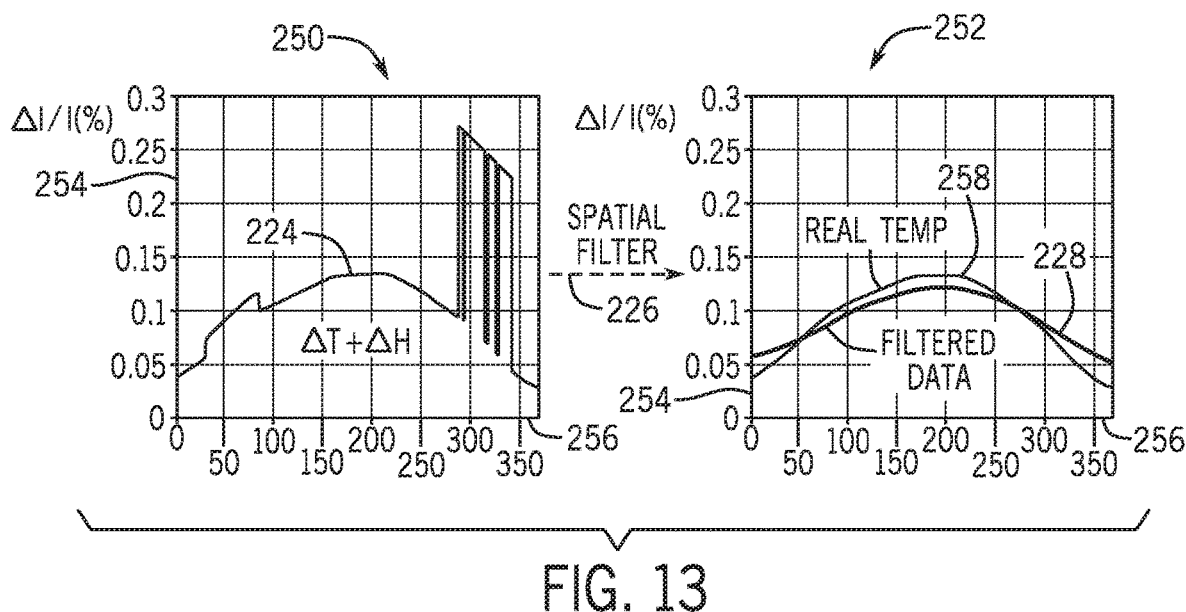
FIG. 13 is an illustration of the effect of the system of FIG. 12 in the sensing errors, in accordance with an embodiment.

The charts in FIG. 13 illustrate an example of an application of a spatial filter 226 to sensing data from a display. Chart 250 illustrates the sensing signal prior to filtering and chart 252 illustrates sensing after the filtering process. Both charts 250 and 252 show the sensing variation 254 as a function of pixel position 256. Note that the sensing data 224 includes high frequency artifacts as well as low frequency artifacts. After spatial filtering 226, the filtered data 228 may have much less high frequency content. Note that the temperature profile 258 may correlate with filtered data 228. In some implementations, as discussed above, the filter may be used to mitigate preferentially errors from hysteresis, as opposed to errors from thermal variations.

Figure 14:
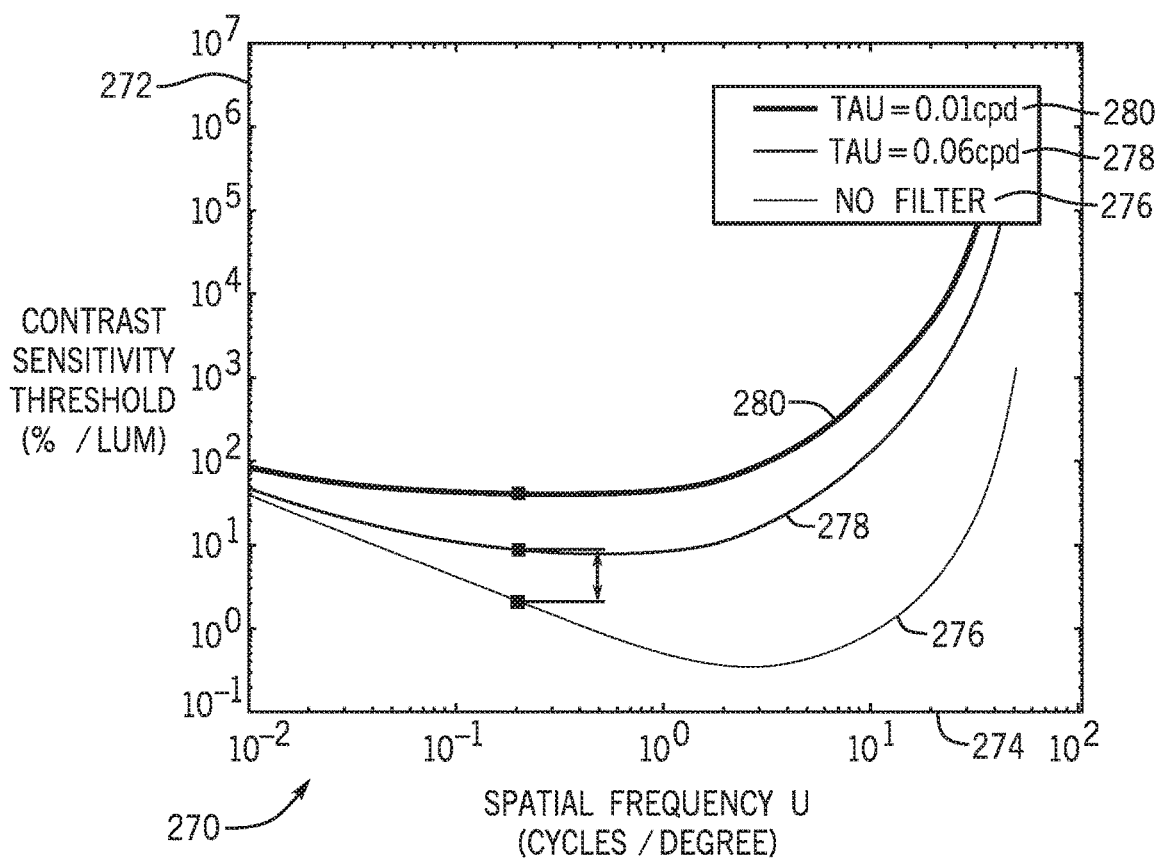
FIG. 14 is an illustration of the increased tolerance to hysteresis-induced sensing errors that may be obtained by the system of FIG. 12, in accordance with an embodiment.

Filtering of high frequency sensing errors may lead to a reduced impact on the visual experience for a user of an electronic device. The chart 270 in FIG. 14 illustrates the effect by providing an effective contrast sensitivity threshold 272 as a function of the spatial frequency 274 of visual artifacts. The effective contrast sensitivity threshold 272 denotes the variation in luminance that an artifact may be perceived by a user. The chart provides the effective contrast sensitivity threshold 272 for a system with no filter (curve 276), a system with a filter having cut-off frequency (e.g., corner frequency) of 0.06 cpd (cycle per degree) and a filter having a cut-off frequency of 0.01 cpd. The spatial filter increases the contrast sensitivity threshold, at the risk of opposing high spatial thermal frequency error which is high pass in nature. A bound for the frequency of thermal error suppression is set by the same cut off frequency of the low pass filter. This may correspond to a system that has higher tolerance to sensor errors. Note further that the effect is more pronounced in regions with higher spatial frequency.

Figure 15:
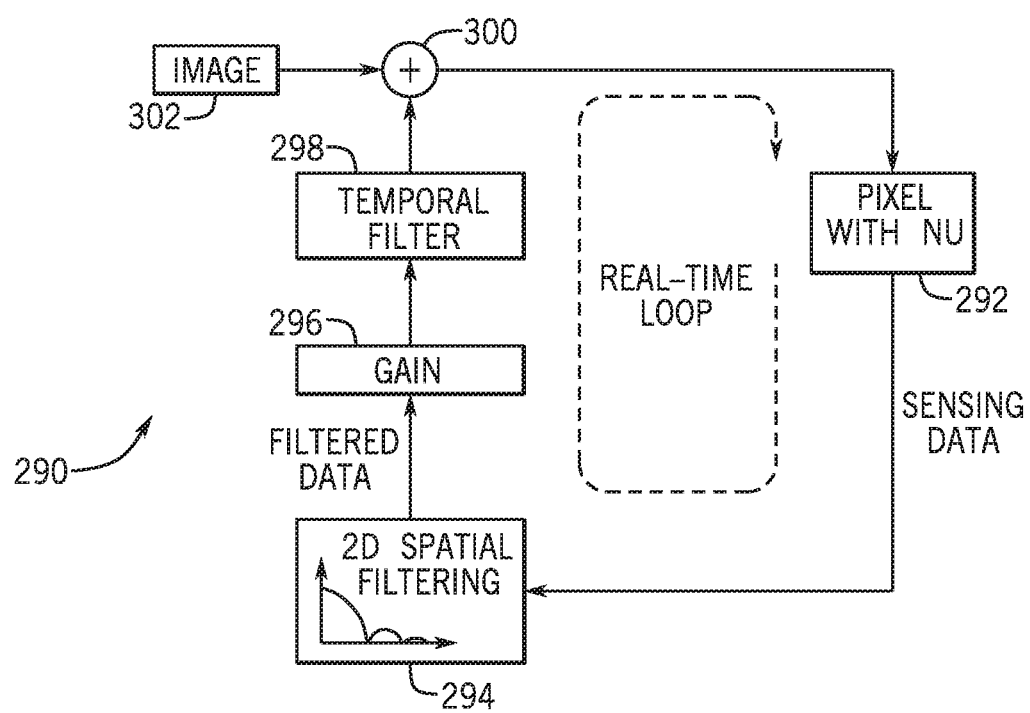
FIG. 15 is a schematic diagram of a system to increase tolerance to hysteresis-induced sensing errors, and that may be used in the display panel correction system such as the one of FIG. 7, in accordance with an embodiment.

The schematic diagram 290 of FIG. 15 illustrates a real-time closed loop system that may be used to correct the pixel using a two-dimensional spatial filtering scheme, as discussed above. In this system, a display pixel 292 may be measured to produce sensing data that may be provided to the two-dimensional low-pass filter 294. Low pass filter 294 may provide filtered data to a gain element 296. The gain element 296 may also convert the signal from luminance units (e.g., metric provided by the display sensor) to voltages (e.g., voltage signal employed by the display driver to calculate target intensity). A temporal filter 298 may also be used to prevent very fast time updates, and potential stabilities. The output signal from the temporal filter may be combined by circuitry 300 with an image signal 302 to generate the set of target luminance provided to the pixel with the proper compensation based on the sensed data. This combined image may be provided by the display pixel 292.

Figure 16A:
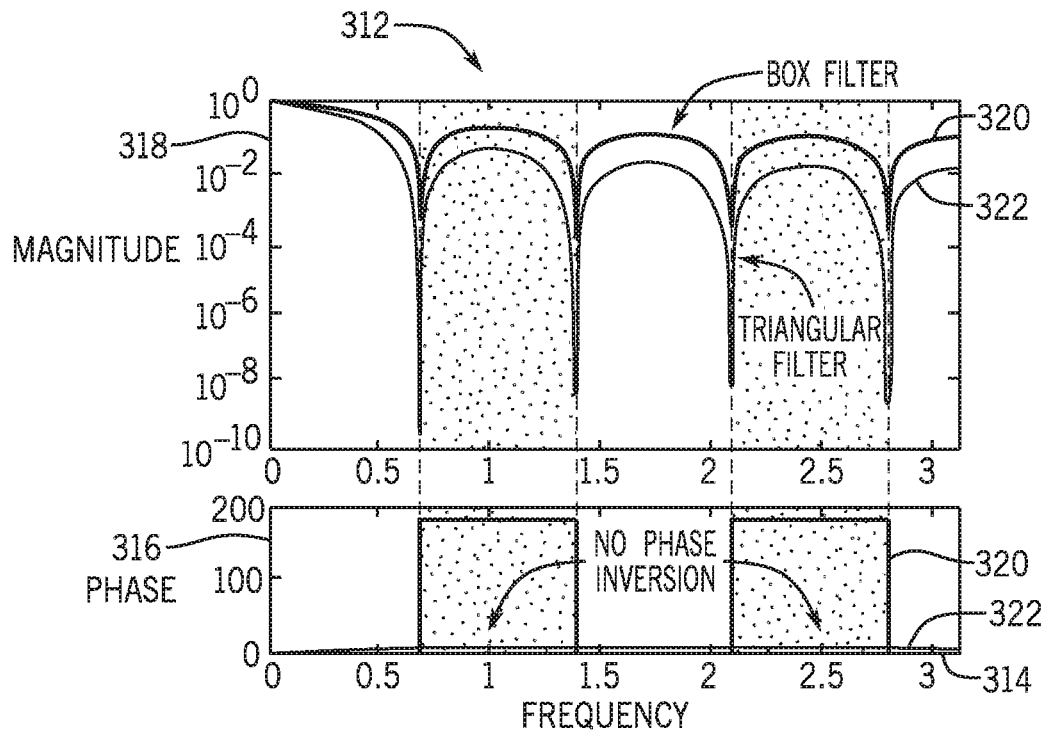
FIGS. 16A and 16B are charts that illustrate the signal response to spatial filters and the feedback loop illustrated in FIG. 15, in accordance with an embodiment.
Figure 16B:
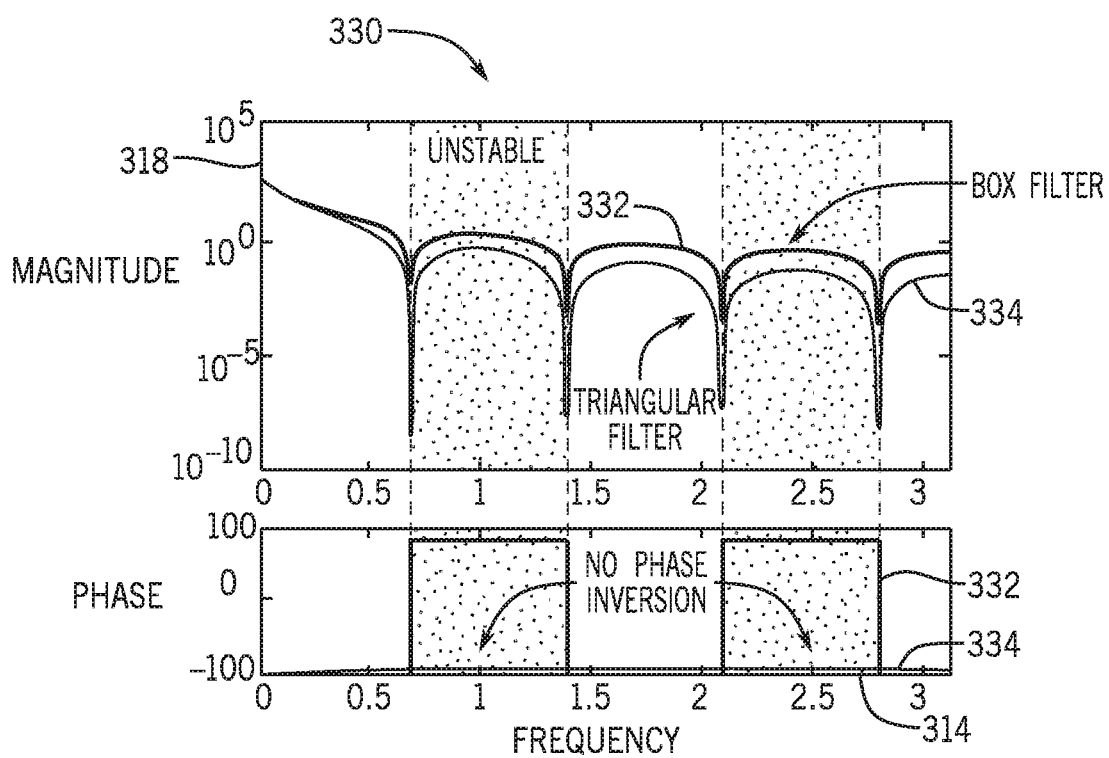
Figure 17:
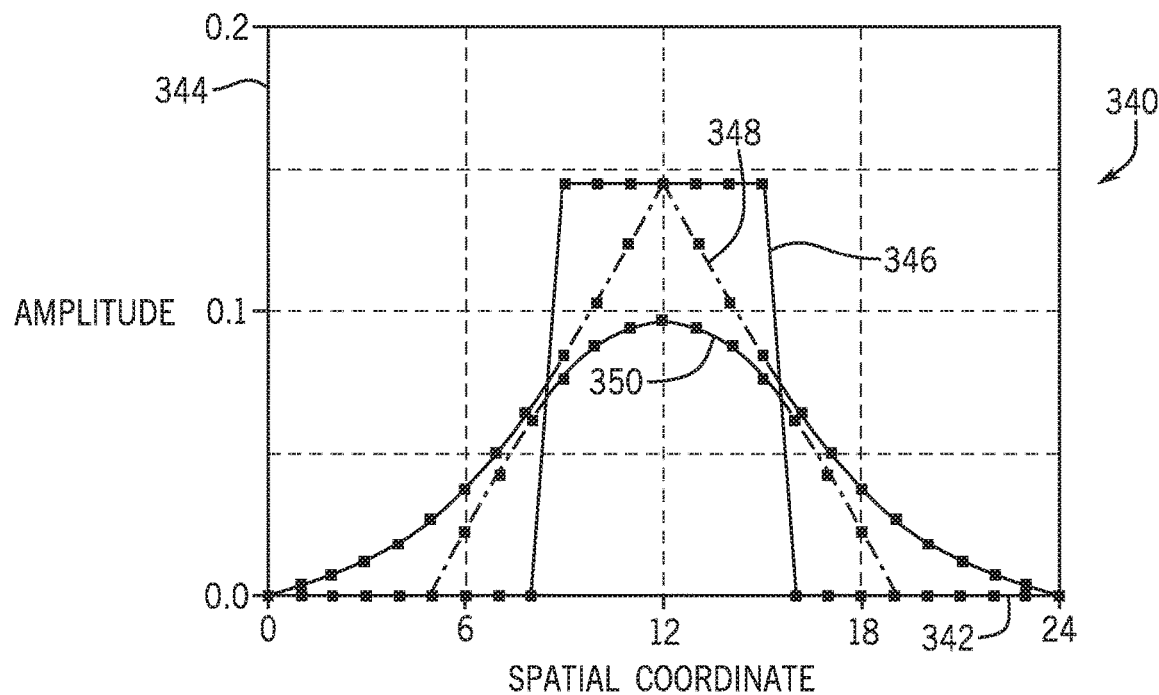
FIG. 17 illustrates multiple filter types that may be used to increase tolerance to hysteresis-induced sensing errors of FIGS. 12 and 14, in accordance with an embodiment.

FIG. 16A provides a Bode chart 312 (phase 316 and magnitude 318 as function of frequency 314) of the open loop response for two spatial filters that may be used in the two-dimensional spatial filtering schemes illustrated above. Response for a box filter 320 (e.g., a square filter) and a triangular filter 322 are provided in chart 312. Note that the box filter 320 may have regions showing phase inversion in certain regions. FIG. 16B provides a Bode chart 330 of the closed loop response for system 290 for a box filter 332 or a triangular filter 334. The presence of phase inversion in the open loop response of the filter may be associated to closed-loop instability behavior for the pixel, which may correspond to flickering artifacts from over correction. Note that a triangle filter may be obtained by concatenating (e.g., convoluting) two box filters. Accordingly, a filter with stable closed loop response may be obtained by concatenating an even number of box filters, since this prevents the presence of phase inversion in the open loop response. FIG. 17 provides a chart 340 illustrating spatial filters that may be used in the schemes described above. Chart 340 illustrates amplitude 344 as a function of a spatial coordinate 342. The chart illustrates a box filter 346, a triangle filter 648, and a Gaussian filter 350.

As discussed above, some artifacts may be generated by an overcorrection of the display luminance due to faulty sensing data. In some situations, this overcorrection may be minimized by employing a partial correction scheme. In such situations, a partial correction map is calculated from the total correction map that is based on the differences between target luminance and sensed luminance. This partial correction map is used by the display driver. A system that employs partial corrections may present a more gradual change in the luminance, and artifacts from sensing errors as the ones discussed above may be unperceived by the user of the display. In some implementations, this scheme may use partial corrections to generate images in the display, but it may instead use the total correction map for adjusting the sensed data. This strategy may be known as a feedforward sensing scheme. Feedforward sensing schemes may be useful as they allow faster convergence of the correction map to the total correction map.

Figure 18:
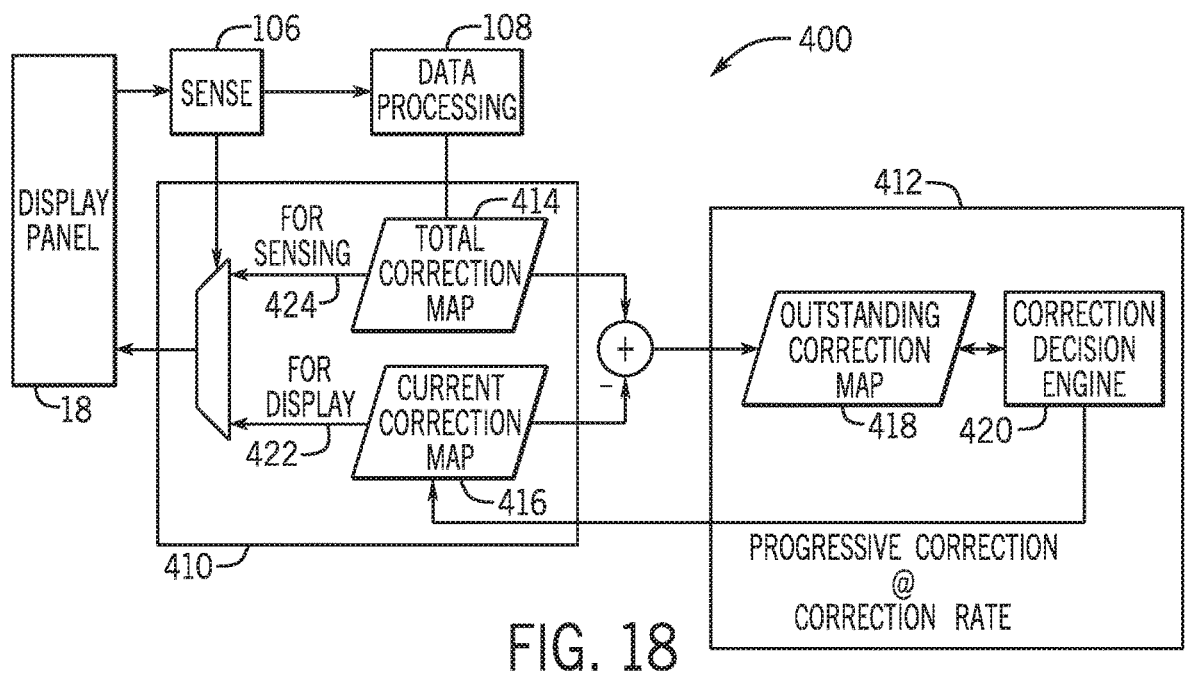
FIG. 18 is a schematic diagram of a system to decrease luminance fluctuations using feedforward sensing and partial corrections to a correction map and that may be used in a display panel correction system such as the one of FIG. 7, in accordance with an embodiment.

With the foregoing in mind, FIG. 18 illustrates a system 400 having a feedforward sensing circuitry 410 along with a partial correction generation circuitry 412. A sensing circuitry 106 may measure luminance in a display panel 18. The sensing data may be provided for data processing circuitry 108 that may obtain a total correction map 414 based on the difference between the target luminance and the sensing data. A current correction map 416, which may have an accumulation of the correction maps that were progressively added, may be compared with the total correction map 414 to obtain an outstanding correction map 418. A correction decision engine 420 may then be used to update the current correction map 416 based on the outstanding correction map 418 and other configurable properties of the partial correction generation system 400. The current correction map 416 may be used to correct the pixel luminance in the display (arrow 422). As discussed below, the total correction map 414 may be used to adjust the sensors (arrow 424) in a feedforward manner. The feedforward strategy prevents the sensing circuitry from introducing errors in the sensing data due to the use of a non-converged current correction map. As a result, the feedforward strategy may accelerate the convergence between the current correction map 416 to the total correction map 414. The updates to the current correction map 416 may take place at a tunable correction rate, based on a desired user experience. Faster correction rates may lead to quicker convergence between the total correction map and the current correction map, which lead to more accurate images. Slower correction rates may lead to slower visual artifacts, which leads to smoother user experience.

Figure 19:
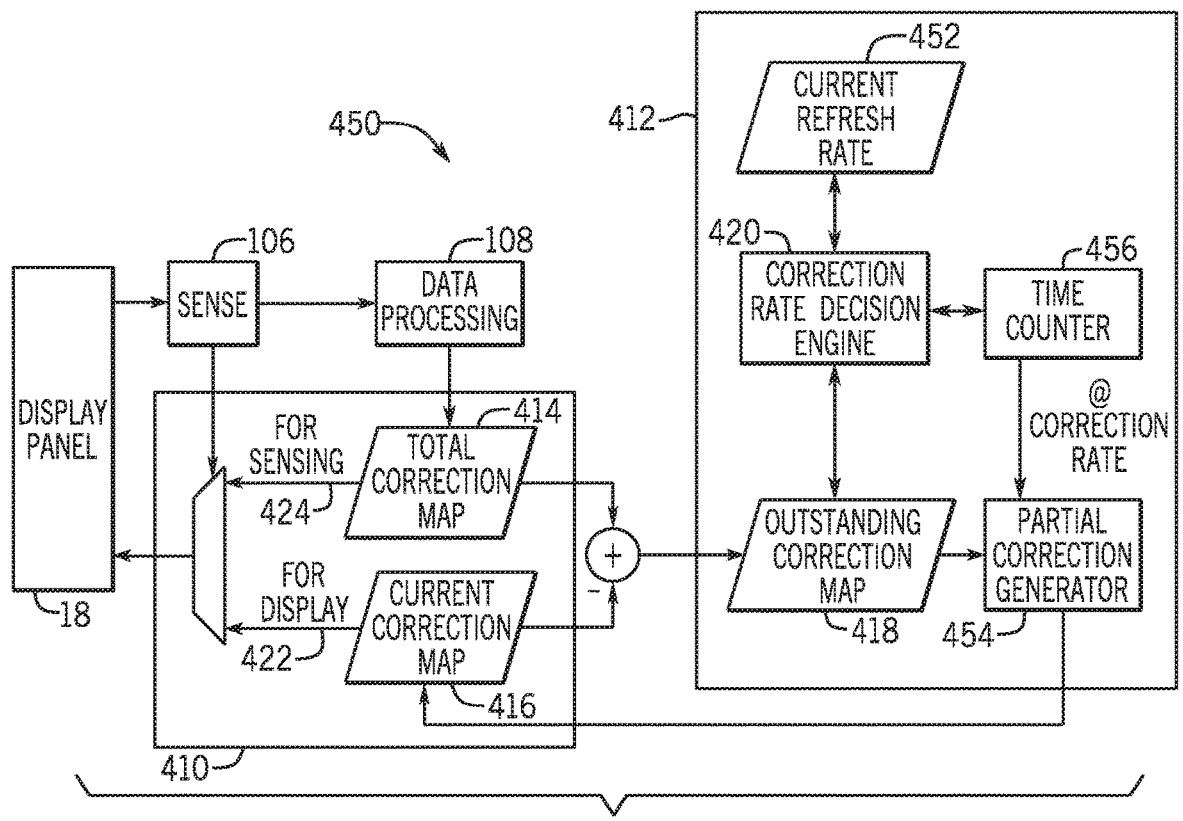
FIG. 19 is another schematic diagram of a system to decrease luminance fluctuations using feedforward sensing and partial corrections to a correction map and that may be used in a display panel correction system such as the one of FIG. 7, in accordance with an embodiment.

FIG. 19 illustrates another system 450 for correction of display panel 18 luminance based on sensed data. In this system, the correction rate may be changed by employing a dynamic refresh rate. Such a system may adapt the progressive correction scheme based on the frequency of the content being displayed by display 18. Sensing circuitry 106 may measure pixel luminance from display 18 and provide the measured luminance to data processing circuitry 108. Data processing circuitry 108 may produce a total correction map 414 based on these measured values and the expected values. As in system 400, an outstanding correction map 418 may be produced from the total correction map 414, and a current correction map that is being used. In system 450, the progressive correction circuitry 412 may also dynamically change the correction rate for the display, using a correction rate decision engine 420. The current refresh rate 452 may be chosen to balance smoothness (e.g., slower updates) and accuracy or speed (e.g., faster updates). Based on the current refresh rate 452 and the outstanding correction map 418, partial correction generator 454 may update the current correction map 416 using a time counter 456 to identify when an update should take place. As in system 400, the current correction map 416 may be used to update the display circuitry (arrow 422) while the total correction map 414 may be used to update the sensing circuitry (arrow 424).

Figure 7:
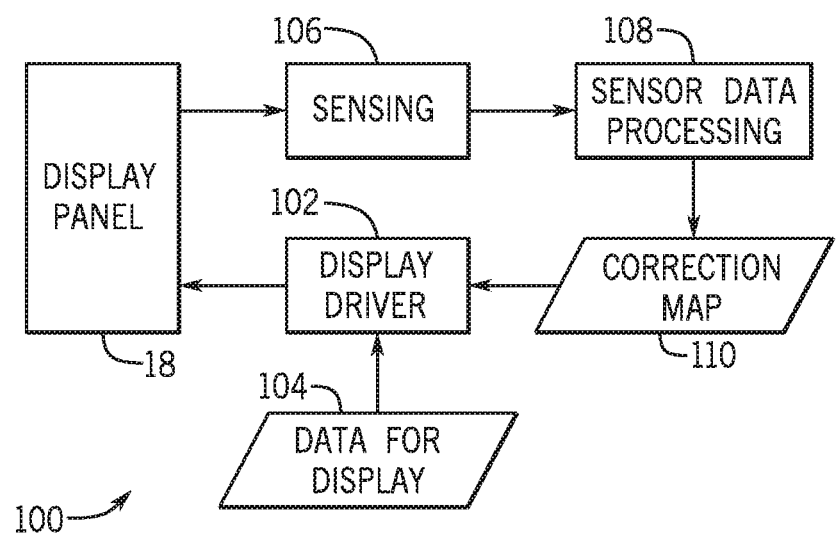
FIG. 7 is a schematic diagram of a display panel correction system that may be used with the electronic device of FIG. 1, in accordance with an embodiment.
Figure 20:
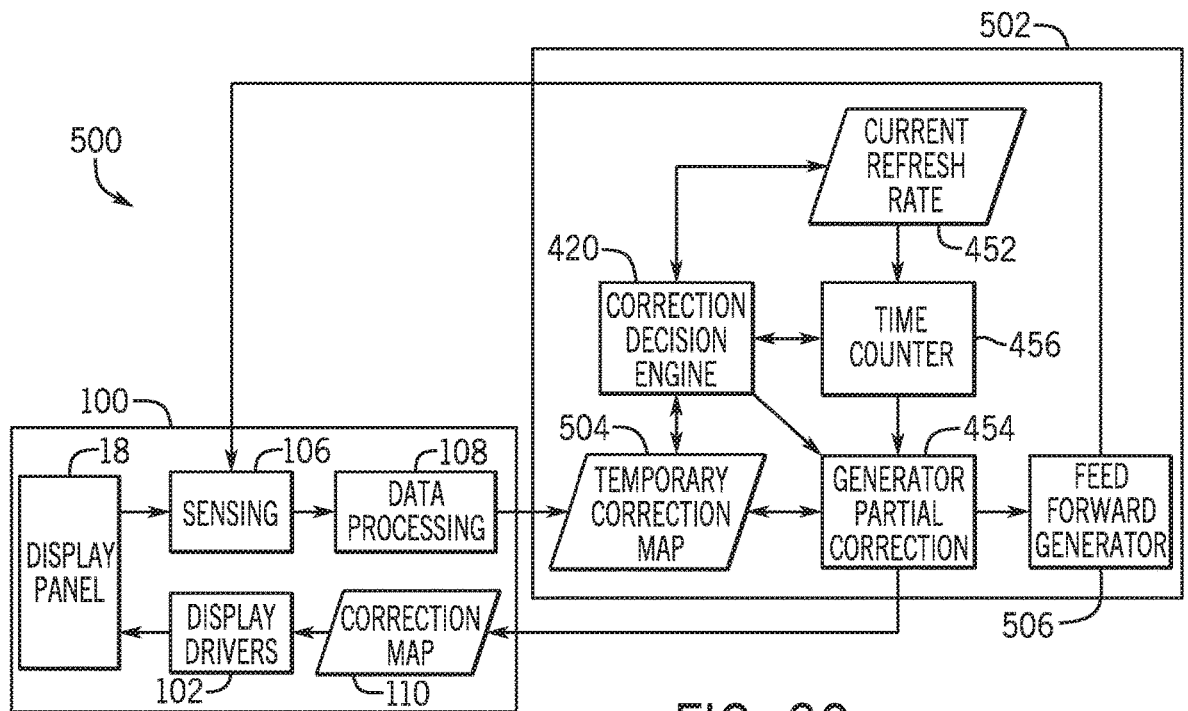
FIG. 20 is another schematic diagram of a system to decrease luminance fluctuations using feedforward sensing and partial corrections to a correction map and that may be used in a display panel correction system such as the one of FIG. 7, in accordance with an embodiment.

In certain situations, the partial correction and feedforward sensing scheme may be added to a sensing and correction system, such as system 100 in FIG. 7. System 500 in FIG. 20 illustrate progressive correction circuitry 502 that may be coupled to system 100 to provide partial correction generation and feedforward sensing. As described above with respect to FIG. 7, sensing circuitry 106 may provide to data processing circuitry 108 measurements of luminance for pixels in display 18. Display driver 102 may use a correction map 110 to display pixels with corrected luminance in display panel 18. Progressive correction circuitry 502 may be coupled to system 100 such that it receives a temporary correction map 504 and provides the correction map 110. The temporary correction map 504 is received by the data processing circuitry 108. A correction decision engine 420 may adjust the current refresh rate 452 based on a desired user experience. The correction decision engine 420 may also control a partial correction generator to produce a correction map 110 to be returned to system 100 based on the temporary correction map 504 and the current refresh rate 452. These decisions may be based on correction speed and step sizes for the partial correction scheme implemented, and may be based on the content being displayed in display 18. The time counter 456 may keep track of the correction rate and to trigger updates to the correction map 110. In system 500, the feedforward sensing scheme may be implemented by using a feedforward generator circuitry 506 that may be calculated by the partial correction generator 454. The feedforward generator 506 may calculate offsets that may be sent to sensing circuitry 106, reducing the time for convergence between the correction map 110 and the total correction map.

Figure 21:
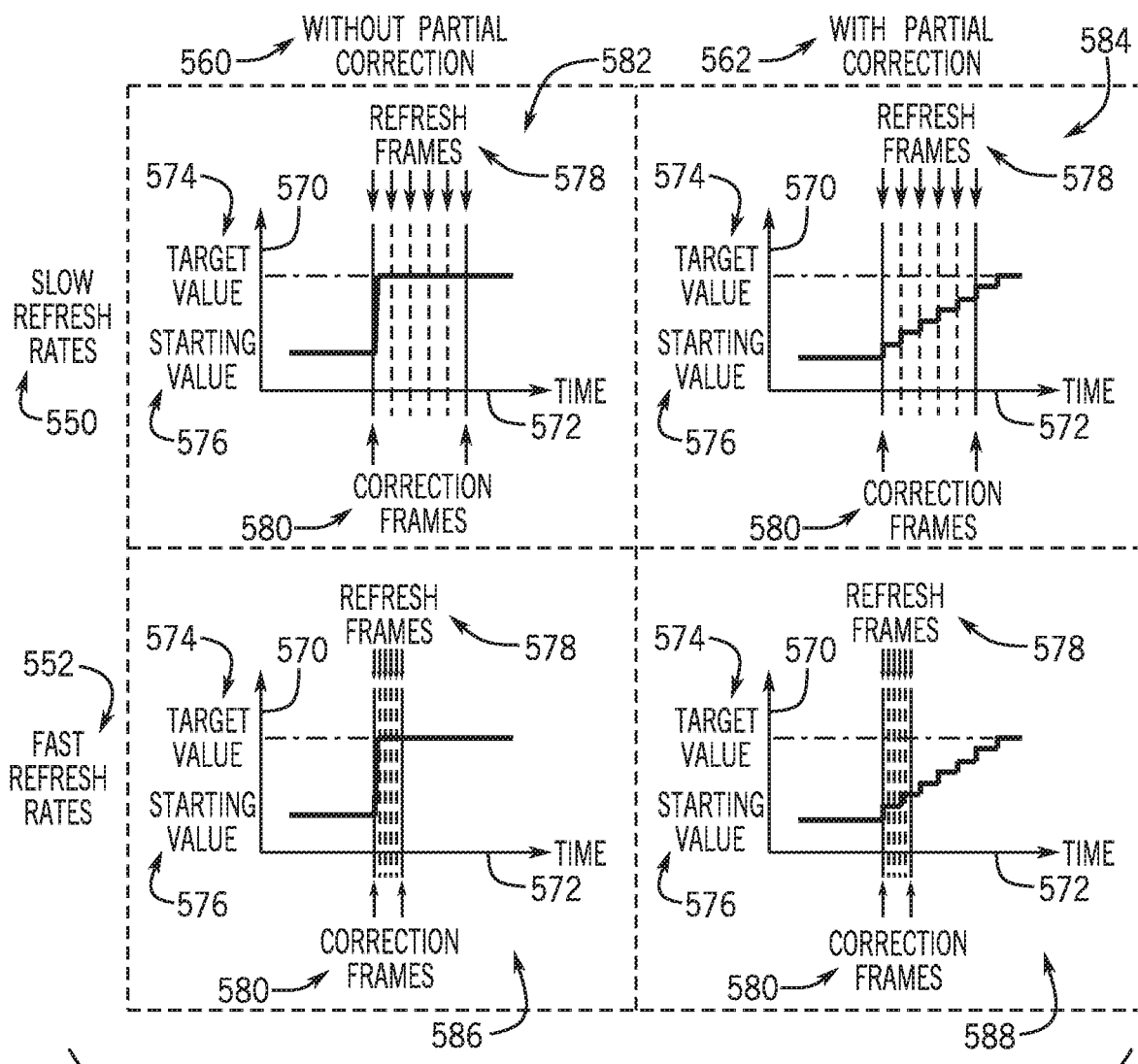
FIG. 21 is a series of charts illustrating the effect of partial correction in decreasing luminance fluctuations observed using any of the systems of FIG. 18, 19, or 20, in accordance with an embodiment.

The charts in FIG. 21 illustrate the performance of systems such as the ones of FIGS. 19, 20, and 21 when the content is updated at a slow refresh rate (row 550) or at a fast refresh rate (row 552). The performance of a system without partial correction (column 560) is compared with that of a system with partial correction (column 562). In all charts, luminance 570 is plotted over time 572. Pixels are driven from a target value 574 from a starting value 576. In all charts, refresh frames (arrows 578) and correction frames (arrows 580) are annotated as reference. Note that at slow refresh rates (row 550), the system without partial correction (chart 582) shows a very sharp correction when it receives a correction frame while the system with partial correction (chart 584) shows a smoother transition towards the target value. The slow variation may correspond to a more pleasant interface experience for the user. Similarly, at a fast refresh rate (row 552), the system without partial correction (chart 586) shows a much sharper correction when compared to the system with partial correction (chart 588). Note that at fast refresh rates, a new correction frame may be received before the luminance reaches the target value. In such situations, a reduction in the correction rate may be used. Note that the use of partial corrections (column 562) generally leads to a gradual, non-noticeable correction to a user.

Figure 22:
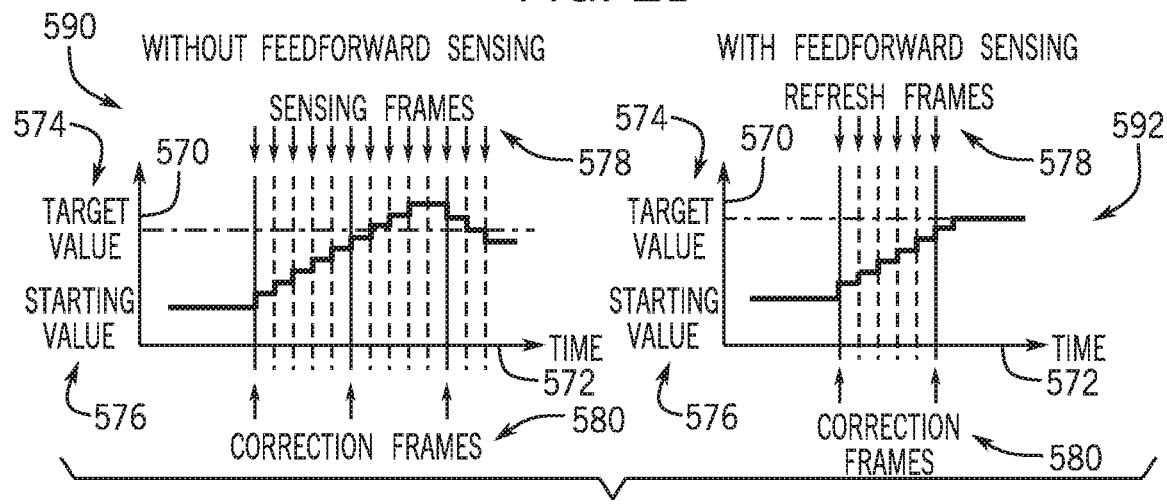
FIG. 22 is a series of charts illustrating the effect of feedforward sensing in decreasing luminance fluctuations observed using any of the systems of FIG. 18, 19, or 20, in accordance with an embodiment.

FIG. 22 illustrates the effect of feedforward sensing strategies to accelerate convergence of the luminance to a target value. Chart 590 shows luminance 570 as function of time 572 in a system without forward sensing. Note that in chart 590 the luminance value overshoots the target value before reaching the target value 574. Since the full correction map is applied in partial steps (e.g., partial correction maps) in a partial correction system, the sensing circuit will sense a partially corrected image and will operate as if an additional amount of correction needs to be applied. As a result, the following correction frame may overcorrect the luminance, since it was calculated without adequate information. This overcorrection leads to the overshoot performance and may delay convergence to the target value 574. By contrast, in chart 592, the luminance value progressively converges from starting value 576 to target value 574 without overshooting. As discussed above, with feedforward schemes, the sensing circuitry operates using the full correction map, and as a result, the sensing data will reflect the actual panel values immediately before the new correction frame is calculated. The feedforward sensing scheme, therefore, may lead to a faster convergence, as illustrated.

The charts illustrated in FIGS. 23A, 23B, 23C, and 23D provide the performance of pixel luminance 570 in transitions from a brighter region (curves 602) and from a dimmer regions (curves 604) to a target gray level as a function of time 572. These charts illustrate the effect of partial corrections, per-frame partial corrections, and feedforward sensing schemes that may be used to obtain reduced visibility from corrections. In chart 700 of FIG. 23A, the performance of a system without partial correction systems is illustrated. Note that, while both curves 602A and 604A converge to the desired grey level quickly, both curves present visible luminance jumps (edges 610) that may interfere with the user experience. The incorporation of partial corrections, illustrated in chart 710 of FIG. 23B mitigate the presence of visible artifacts by providing a more gradual transition (region 612). In such system, the convergence may, however, take longer than without the partial correction mechanism.

Figure 23A:
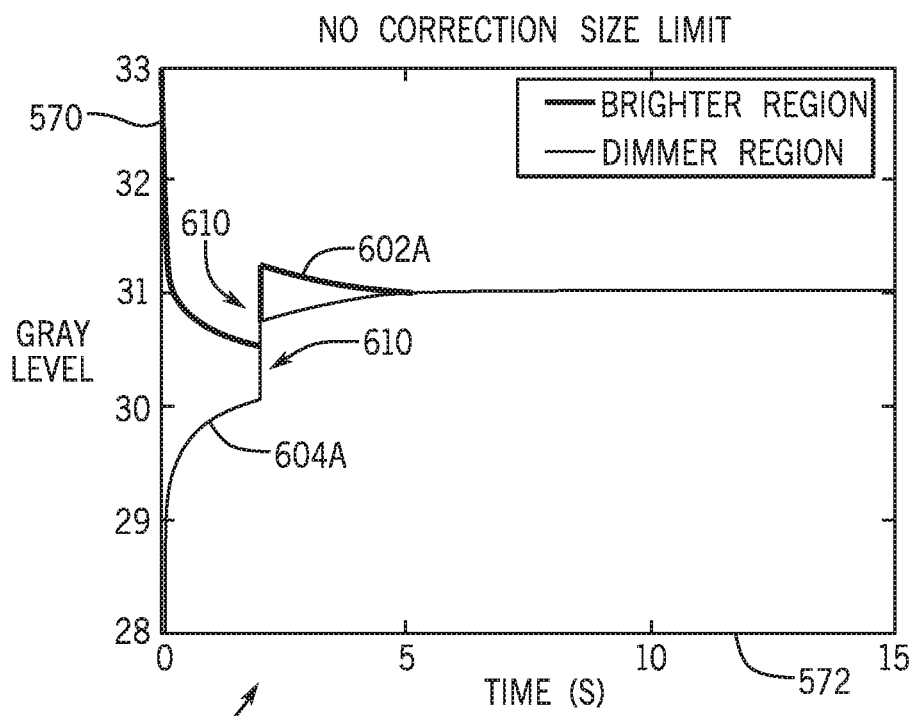
FIGS. 23A-D are charts that illustrate the effect of feedforward sensing and partial correction in decreasing luminance fluctuations observed using any of the systems of FIG. 18, 19, or 20, in accordance with an embodiment.
Figure 23B:
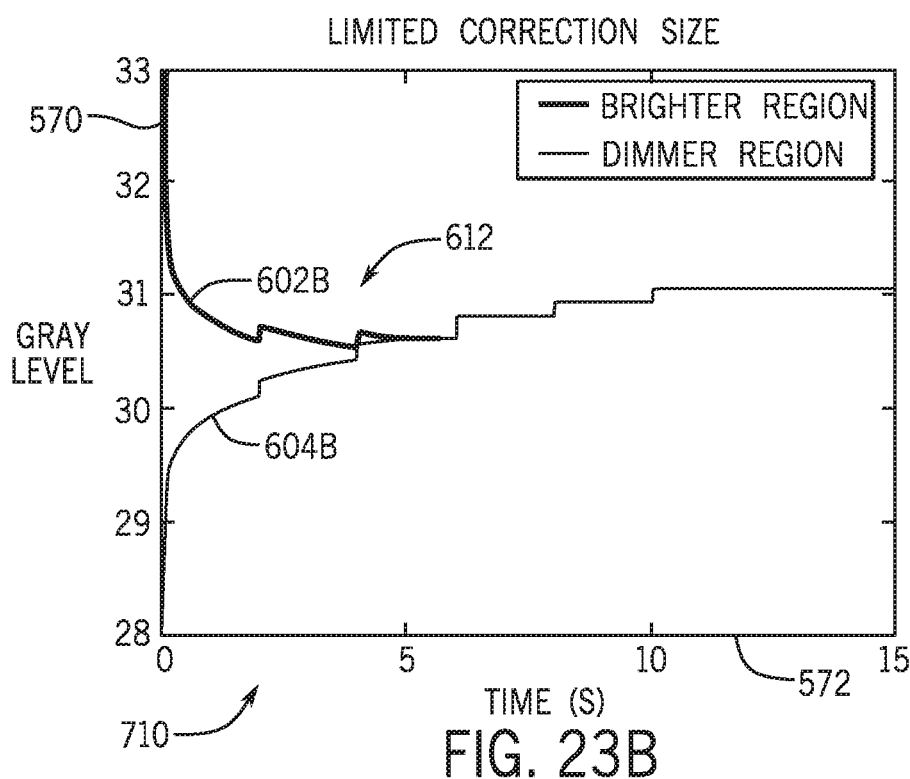
Figure 23C:
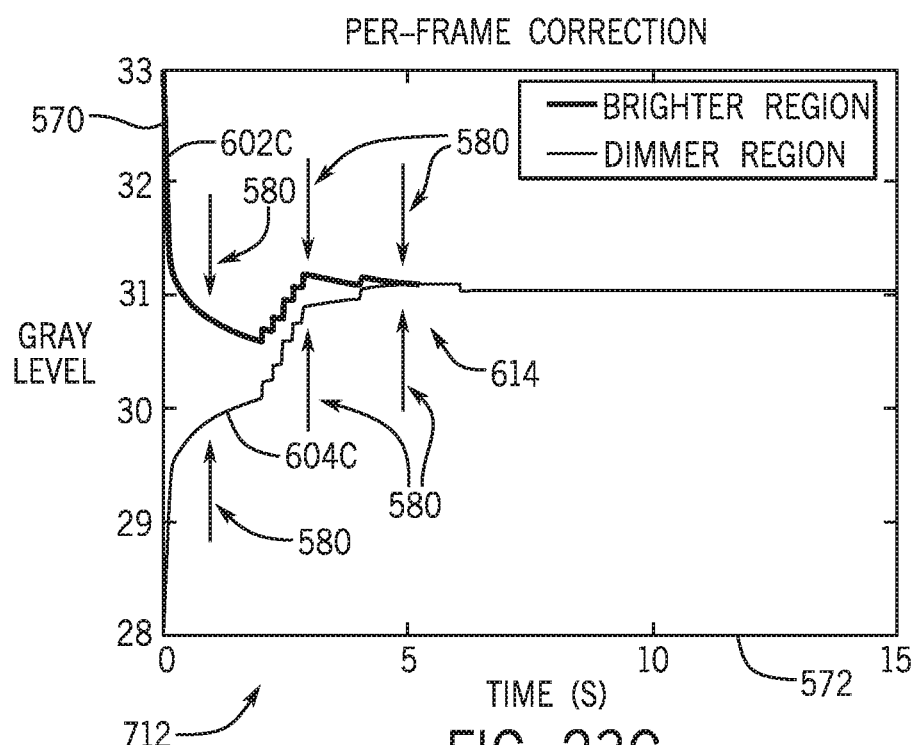
Figure 23D:
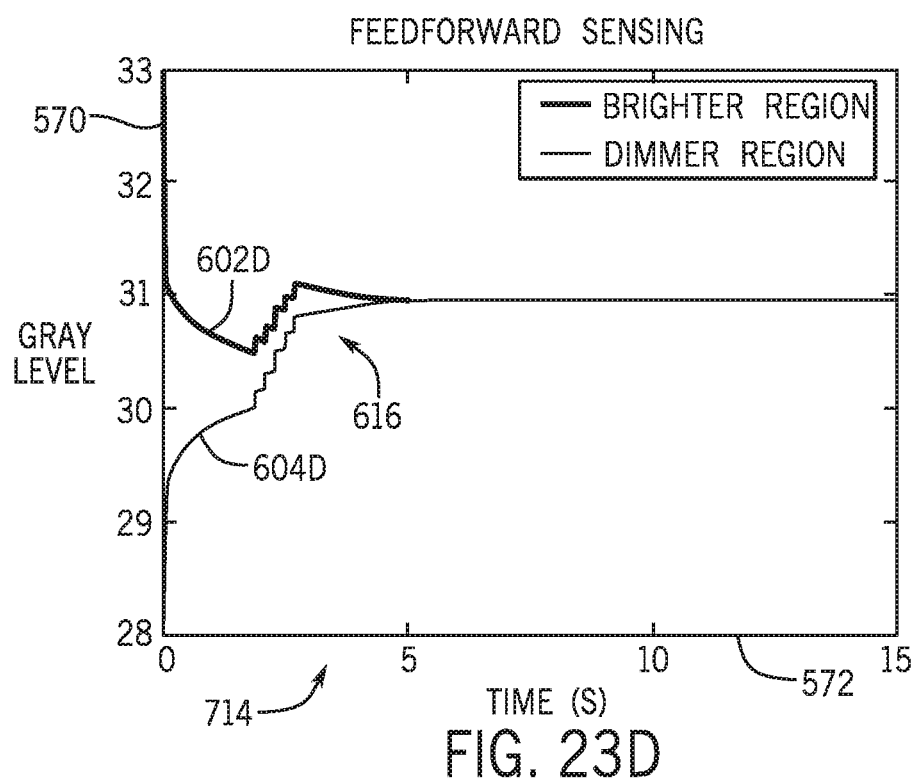

The use of per-frame partial corrections is illustrated in chart 712 of FIG. 23C. In such system, the correction system still incorporates partial corrections, but the partial corrections are calculated on a per-correction frame basis. The sensing takes place for the particular pixel whose luminance at the instants annotated by arrows 580. Corrections frames are located halfway between the sensing frames annotated by arrows 580. Note that transition into the target luminance remains gradual (region 614), but the convergence time decreased, when compared to the ones observed in chart 710. Chart 714 in FIG. 23D illustrates the effect of feedforward sensing in the performance of a system with partial correction. In this situation, the convergence may be reached as fast as in the situation without convergence illustrated in chart 700, but with a smoother transition (region 616) which mitigates the presence of visual artifacts.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
   a display panel comprising at least an array of pixels;
   sensing circuitry that measures a luminance of the array of pixels and produces sensing data from the measurement;
   filtering circuitry that produces filtered sensing data from the sensing data, wherein the filtering circuitry applies a two-dimensional low pass filter;
   data processing circuitry that receives the filtered sensing data and produces a correction map; and
   a display driver configured to receive an image data and the correction map and adjust the luminance of the array of pixels and cause the display panel to display an image based on the image data and the correction map.

2. The electronic device of claim 1, wherein the two-dimensional low pass filter comprises a box filter, a triangular filter, or a Gaussian filter.

3. The electronic device of claim 1, wherein the two-dimensional low pass filter comprises a cut-off frequency substantially between 0.1 and 1.5 cycles per degree.

4. The electronic device of claim 1, wherein the two-dimensional low pass filter comprises a cut-off frequency that is above a frequency of thermal error and below a frequency of hysteresis error.

5. The electronic device of claim 4, wherein the hysteresis error comprises a trap error or a de-trap error.

6. A closed-loop method to filter sensed data for display panel correction comprising:
   receiving image data;
   receiving sensing data associated with a display panel from sensing circuitry coupled to the display panel;
   filtering the sensing data to produce filtered sensed data consisting of low-frequency content from the sensing data;
   converting the filtered sensed data to display correction data;
   combining the display correction data with the image data to produce corrected image data; and
   causing the display panel to display the corrected image data.

7. The method of claim 6, wherein converting the filtered sensed data to the display correction data comprises converting luminance units to display voltage units.

8. The method of claim 6, wherein filtering the sensing data comprises performing a convolution between a two-dimensional low-pass filter and the sensed data.

9. The method of claim 8, wherein the two-dimensional low-pass filter comprises a combination of an even number of two-dimensional box filters.

10. The method of claim 6, wherein converting the filtered sensed data comprises a look-up table.

11. The method of claim 6, wherein converting the filtered sensed data comprises:
    producing a total correction map based on a difference between the filtered sensed data and the image data; and
    producing the display correction data based on the total correction map and a step limit, wherein the step limit is based on a perception threshold.

* * * * *